United States Patent
Miyano

(10) Patent No.: US 9,811,755 B2
(45) Date of Patent: Nov. 7, 2017

(54) OBJECT MONITORING SYSTEM, OBJECT MONITORING METHOD, AND MONITORING TARGET EXTRACTION PROGRAM

(71) Applicant: NEC Corporation, Tokyo (JP)

(72) Inventor: Hiroyoshi Miyano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/780,884

(22) PCT Filed: Feb. 25, 2014

(86) PCT No.: PCT/JP2014/000977
§ 371 (c)(1),
(2) Date: Sep. 28, 2015

(87) PCT Pub. No.: WO2014/155958
PCT Pub. Date: Oct. 2, 2014

(65) Prior Publication Data
US 2016/0042243 A1    Feb. 11, 2016

(30) Foreign Application Priority Data

Mar. 29, 2013    (JP) .................... 2013-070961

(51) Int. Cl.
*G06K 9/00* (2006.01)
*G06K 9/46* (2006.01)
(Continued)

(52) U.S. Cl.
CPC ........... *G06K 9/46* (2013.01); *G06K 9/00255* (2013.01); *G06K 9/00342* (2013.01);
(Continued)

(58) Field of Classification Search
CPC ............... G06K 9/00; H04N 7/00; A61B 5/00
(Continued)

(56) References Cited

U.S. PATENT DOCUMENTS 8,254,691 B2 * 8/2012 Kaneda ............. G06K 9/00744
382/103
8,447,178 B2 * 5/2013 Yasuda ............. H04N 5/23212
396/78
(Continued)

FOREIGN PATENT DOCUMENTS

CN    102682568    9/2012
EP    2 453 412 A2    5/2012
(Continued)

OTHER PUBLICATIONS

Extended European Search Report dated Oct. 11, 2016, by the European Patent Office in counterpart European Patent Application No. 14775764.5.
(Continued)

*Primary Examiner* — Abolfazl Tabatabai
(74) *Attorney, Agent, or Firm* — Finnegan, Henderson, Farabow, Garrett & Dunner, L.L.P.

(57) ABSTRACT

First imaging means 60 creates a state image by capturing a state occurring in a first range. Second imaging means 70 creates a monitoring target image by capturing a monitoring target present in a second range. Specific state detection means 81 detects a specific state from the state image. Monitoring target analysis means 82 analyzes a status of a monitoring target, using the state image from which the specific state is detected. Monitoring target feature extraction means 85 extracts, from the monitoring target image, a feature used for specifying the monitoring target, based on the status of the monitoring target.

17 Claims, 6 Drawing Sheets

(51) Int. Cl.
*H04N 7/18* (2006.01)
*H04N 17/00* (2006.01)

(52) U.S. Cl.
CPC .......... *G06K 9/00771* (2013.01); *H04N 7/18* (2013.01); *H04N 7/181* (2013.01)

(58) Field of Classification Search
USPC ............... 382/103, 104, 107, 115–118, 236; 348/149, 164, 169–172, 352, 180, 184; 700/91, 108, 144, 174
See application file for complete search history.

(56) References Cited

U.S. PATENT DOCUMENTS

| | | | |
|---|---|---|---|
| 9,071,753 B2* | 6/2015 | Ishida | ................ H04N 5/23238 |
| 2005/0207622 A1 | 9/2005 | Haupt et al. | |
| 2006/0126738 A1 | 6/2006 | Boice et al. | |
| 2006/0195199 A1 | 8/2006 | Iwasaki et al. | |
| 2007/0070190 A1 | 3/2007 | Yin et al. | |
| 2008/0169929 A1 | 7/2008 | Albertson et al. | |
| 2008/0211916 A1 | 9/2008 | Ono | |
| 2009/0183177 A1 | 7/2009 | Brown et al. | |
| 2010/0172543 A1 | 7/2010 | Winkler | |
| 2012/0120248 A1 | 5/2012 | Han et al. | |

FOREIGN PATENT DOCUMENTS

| | | |
|---|---|---|
| JP | 2003-169320 | 6/2003 |
| JP | 2008-252863 | 10/2008 |
| RU | 36912 U1 | 3/2004 |
| WO | WO 03/067360 A2 | 8/2003 |
| WO | WO 2009/079809 A1 | 7/2009 |

OTHER PUBLICATIONS

Written Opinion and Search Report issued by the Singapore Patent Office dated Mar. 18, 2016, in counterpart Singapore Patent Application No. 11201508077U.

K. Smith et al., "Detecting Abandoned Luggage Items in a Public Space", IEEE Performance Evaluation of Tracking and Surveillance Workshop (PETS), IDIAP Research Report, Computer Vision and Pattern Recognition (CVPR), pp. 1-14, Jun. 2006.

Office Action issued by the Russian Patent Office dated Jul. 1, 2016, in counterpart Russian Patent Application No. 2015141277/07(063604).

D. Gibbins et al., "Detecting Suspicious Background Changes in Video Surveillance of Busy Scenes", Centre for Sensor Signal and Information Processing, Signal Processing Research Institute, 1996.

International Search Report and Written Opinion of ISA dated Apr. 28, 2014.

\* cited by examiner

OBJECT MONITORING SYSTEM, OBJECT MONITORING METHOD, AND MONITORING TARGET EXTRACTION PROGRAM

CROSS-REFERENCE TO RELATED PATENT APPLICATIONS

This application is a National Stage Entry of International Application No. PCT/JP2014/000977, filed Feb. 25, 2014, which claims priority from Japanese Patent Application No. 2013-070961, filed Mar. 29, 2013. The entire contents of the above-referenced applications are expressly incorporated herein by reference.

TECHNICAL FIELD

The present invention relates to an object monitoring system, a monitoring target extraction device, an object monitoring method, a monitoring target extraction method, and a monitoring target extraction program for monitoring an object of interest.

BACKGROUND ART

Various methods of detecting diverse situations from images captured by a camera installed for monitoring are known. Moreover, with recent advances in face recognition technology, it is now possible to determine whether or not persons in different images are the same person by comparing images captured by a camera for capturing human faces.

Various methods of detecting problematic behaviors such as garbage dumping or graffiti are also known. For example, Non Patent Literature (NPL) 1 describes a method of detecting problematic states by detecting suspicious background changes from images captured by a camera for monitoring busy scenes.

CITATION LIST

Non Patent Literature(s)

NPL 1: D. Gibbins, G. N. Newsam and M. J. Brooks, "Detecting Suspicious Background Changes in Video Surveillance of Busy Scenes," 1996.

SUMMARY OF INVENTION

Technical Problem

In recent years, there is a demand to not only detect problematic states from images captured by a monitoring camera but also specify causes of such problems. For example, it is preferable that a habitual offender who displays problematic behaviors such as garbage dumping or graffiti can be automatically found from images captured by a monitoring camera.

This requires two techniques, namely, a technique of detecting problematic behaviors such as garbage dumping or graffiti and a technique of determining whether or not the problematic behaviors are by the same person. However, it is difficult to specify a person responsible for each problematic behavior, using the technique of detecting problematic behaviors.

To capture images of problematic behaviors, a camera with a large depression angle is desirably installed so as not to be obstructed by other persons even in a congested environment. To determine whether or not persons in different images are the same person, on the other hand, it is necessary to capture each human face from the front as much as possible, because of constraints in face recognition between images. Hence, to capture images of human faces, a camera with a small depression angle is desirably installed.

It is thus difficult to simultaneously realize the above-mentioned two techniques using the same camera. In other words, for example, a habitual offender who displays problematic behaviors is hard to be automatically found by simply combining the above-mentioned two techniques.

In view of this, an exemplary object of the present invention is to provide an object monitoring system, a monitoring target extraction device, an object monitoring method, a monitoring target extraction method, and a monitoring target extraction program with which an object that is presumed to be a cause of a specific state can be automatically collected from images captured by installed cameras.

Solution to Problem

An object monitoring system according to an exemplary aspect of the present invention includes: first imaging means for creating a state image by capturing a state occurring in a first range; second imaging means for creating a monitoring target image by capturing a monitoring target present in a second range; specific state detection means for detecting a specific state from the state image; monitoring target analysis means for analyzing a status of a monitoring target, using the state image from which the specific state is detected; and monitoring target feature extraction means for extracting, from the monitoring target image, a feature used for specifying the monitoring target, based on the status of the monitoring target.

A monitoring target extraction device according to an exemplary aspect of the present invention includes: specific state detection means for detecting a specific state from a state image captured by first imaging means for capturing a state occurring in a first range; monitoring target analysis means for analyzing a status of a monitoring target, using the state image from which the specific state is detected; and monitoring target feature extraction means for extracting, from a monitoring target image captured by second imaging means for capturing a monitoring target present in a second range, a feature used for specifying the monitoring target, based on the status of the monitoring target.

An object monitoring method according to an exemplary aspect of the present invention includes: creating a state image by capturing a state occurring in a first range; detecting a specific state from the state image; analyzing a status of a monitoring target, using the state image from which the specific state is detected; creating a monitoring target image by capturing a monitoring target present in a second range, based on the status of the monitoring target; and extracting, from the monitoring target image, a feature used for specifying the monitoring target.

A monitoring target extraction method according to an exemplary aspect of the present invention includes: detecting a specific state from a state image captured by first imaging means for capturing a state occurring in a first range; analyzing a status of a monitoring target, using the state image from which the specific state is detected; and extracting, from a monitoring target image captured by second imaging means for capturing a monitoring target present in a second range, a feature used for specifying the monitoring target, based on the status of the monitoring target.

A monitoring target extraction program according to an exemplary aspect of the present invention causes a computer to execute: a specific state detection process of detecting a specific state from a state image captured by first imaging means for capturing a state occurring in a first range; a monitoring target analysis process of analyzing a status of a monitoring target, using the state image from which the specific state is detected; and a monitoring target feature extraction process of extracting, from a monitoring target image captured by second imaging means for capturing a monitoring target present in a second range, a feature used for specifying the monitoring target, based on the status of the monitoring target.

Advantageous Effect of Invention

According to the present invention, an object that is presumed to be a cause of a specific state can be automatically collected from images captured by installed cameras.

DESCRIPTION OF EMBODIMENTS

Figure 1:
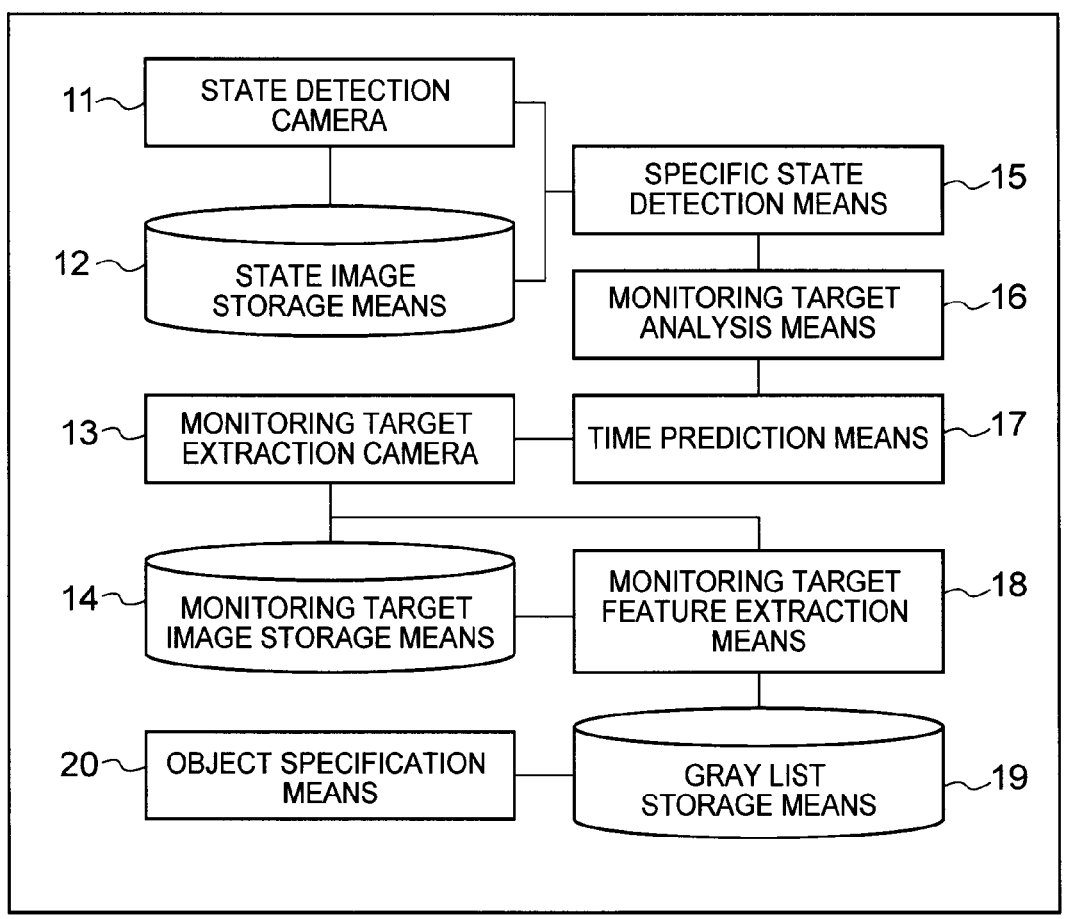
FIG. 1 It is a block diagram depicting an exemplary embodiment of an object monitoring system according to the present invention.

FIG. 1 is a block diagram depicting an exemplary embodiment of an object monitoring system according to the present invention. The object monitoring system in this exemplary embodiment includes a state detection camera 11, state image storage means 12, a monitoring target extraction camera 13, monitoring target image storage means 14, specific state detection means 15, monitoring target analysis means 16, time prediction means 17, monitoring target feature extraction means 18, gray list storage means 19, and object specification means 20.

The state detection camera 11 is a camera installed to capture an image of a range in which a specific state is to be detected. The specific state means, for example, a state in which a problematic behavior as mentioned above (e.g. garbage dumping, graffiti, loitering, etc.) occurs. Note that the specific state is not limited to a state in which a problematic behavior occurs, and may be, for example, a state in which a desirable behavior occurs.

The state detection camera 11 is preferably installed to have a large depression angle, in order to capture an image from which a state occurring in a predetermined range can be detected more appropriately.

In the following description, the image captured by the state detection camera 11 is referred to as "state image". In addition, the range captured by the state detection camera 11 is referred to as "first range", to distinguish it from the range captured by the below-mentioned monitoring target extraction camera 13. The first range is determined according to the installation position, installation angle, set zoom, and the like of the state detection camera 11. For example, the first range may be expressed by an angle of view. The state detection camera 11 registers the captured state image and information relating to the state image, in the state image storage means 12.

The state image storage means 12 stores the state image captured by the state detection camera 11. The state image storage means 12 may store the time and position at which the state image is captured, information for identifying the camera capturing the state image, and the like, together with the state image.

The monitoring target extraction camera 13 is a camera installed to capture a monitoring target appearing in a predetermined range. The monitoring target is determined according to the type of object that is presumed to be the cause of the specific state. As an example, the above-mentioned problematic behavior such as garbage dumping, graffiti, or loitering is attributed to a person, and so the monitoring target is a person. Here, the monitoring target extraction camera 13 may create a monitoring target image by capturing a person as the monitoring target.

As another example, snatching by a motorcycle rider is attributed to a motorcycle which the snatcher rides, and so the monitoring target is a motorcycle. Note that the monitoring target is not limited to a person or a motorcycle, and may be a car and the like.

The monitoring target image captured by the monitoring target extraction camera 13 is used by the below-mentioned monitoring target feature extraction means 18 to extract a feature that can be used for specifying the monitoring target. The monitoring target extraction camera 13 is preferably installed to have a small depression angle, in order to capture an image from which the feature of the monitoring target can be extracted more appropriately.

In the following description, the image captured by the monitoring target extraction camera 13 is referred to as "monitoring target image". In addition, the range captured by the monitoring target extraction camera 13 is referred to as "second range". The second range is determined according to the installation position, installation angle, set zoom, and the like of the monitoring target extraction camera 13, too. For example, the second range may be expressed by an angle of view. The first range and the second range may partly or wholly overlap with each other, or not overlap with each other at all.

The monitoring target extraction camera 13 registers the captured monitoring target image and information relating to the monitoring target, in the monitoring target image storage means 14.

Though an example where each of the number of state detection cameras 11 for capturing state images and the number of monitoring target extraction cameras 13 for capturing monitoring target images is one is used in this exemplary embodiment, each of the number of cameras for capturing state images and the number of cameras for capturing monitoring target images is not limited to one, and may be two or more.

Typically, a camera with a large depression angle is desirably installed in order to capture a state of a predetermined range, whereas a camera with a small depression angle is desirably installed in order to specify a monitoring target. Accordingly, the depression angle of the state detection camera 11 is set to be larger than the depression angle of the monitoring target extraction camera 13.

The monitoring target image storage means 14 stores the monitoring target image captured by the monitoring target extraction camera 13. The monitoring target image storage means 14 may store the time and position at which the monitoring target image is captured, information for identifying the camera capturing the monitoring target image, and the like, together with the monitoring target image.

The specific state detection means 15 detects the specific state from the state image. The specific state detection means 15 may detect the specific state, using not only the state image currently captured by the state detection camera 11 but also at least one state image of the past (hereafter referred to as "past state image") stored in the state image storage means 12. For example, in the case of detecting a state in which garbage is dumped in the first range, the specific state detection means 15 detects the garbage dumping state which is a problematic behavior, from the state image and past state image captured by the state detection camera 11.

The method of detecting the specific state from the state image by the specific state detection means 15 is arbitrary. The specific state detection means 15 may detect the specific state from the state image using, for example, the method described in NPL 1, or detect the specific state using other methods.

The monitoring target analysis means 16 analyzes the status of the monitoring target, using the state image from which the specific state is detected. The status of the monitoring target means the movement or appearance of the monitoring target that can be specified from the state image or state image group captured by the state detection camera 11. Note that the status of the monitoring target does not need to be information with which an individual monitoring target can be specified. As an example, in the case where the monitoring target is a person, the status of the monitoring target includes the cloths, hairstyle, movement status (e.g. speed, direction), or the like of a person. As another example, in the case where the monitoring target is a car, the status of the monitoring target includes the color, shape, running status, or the like of a car.

Here, the monitoring target analysis means 16 may analyze the status of the monitoring target, using not only the state image from which the specific state is detected but also at least one past state image stored in the state image storage means 12. For example, the monitoring target analysis means 16 may analyze the movement status of the monitoring target, using the state image from which the specific state is detected and at least one past state image captured within a predetermined period (e.g. within 5 seconds) before the state image is captured. By using the past state image(s) in this way, the monitoring target analysis means 16 can analyze the status of the monitoring target more appropriately.

The number of monitoring targets analyzed by the monitoring target analysis means 16 may be one or more. For example, in the case where the monitoring target is a person, the monitoring target analysis means 16 may determine that every person captured at the time of detection of the specific state is suspicious, and analyze every person as the monitoring target.

The time prediction means 17 predicts, from the status of the monitoring target analyzed by the monitoring target analysis means 16, the time at which the monitoring target appears in the range (i.e. the second range) captured by the monitoring target extraction camera 13. The time predicted by the time prediction means 17 is hereafter simply referred to as "predicted time".

Since the range (the first range) captured by the state detection camera 11 and the range (the second range) captured by the monitoring target extraction camera 13 can be specified at the time of installation of each camera, the time prediction means 17 may predict the time at which the monitoring target appears in the second range, based on the positions determined from these ranges.

For instance, in the case where the monitoring target analysis means 16 analyzes the movement status of the monitoring target, the time prediction means 17 can predict the time at which the monitoring target appears in the second range, based on the movement status. In detail, the time prediction means 17 may specify the spatial position and movement direction and speed of the monitoring target from the state image, and calculate, from the specified movement direction and speed, the time at which the monitoring target reaches the spatial position indicating the second range from the specified spatial position.

Note that the time prediction method is not limited to the above-mentioned method. The monitoring target analysis means 16 and the time prediction means 17 may predict the time using other tracking techniques. For example, in the range in which the monitoring target is captured by the state detection camera 11, the monitoring target analysis means 16 may perform tracking using an object tracking technique. In the range in which the monitoring target is not captured by the state detection camera 11, the time prediction means 17 may estimate the elapsed time in consideration of the speed of the monitoring target, and predict the time using the estimated elapsed time.

The monitoring target feature extraction means 18 extracts a feature used for specifying the monitoring target, from the monitoring target image. Here, the monitoring target feature extraction means 18 uses the monitoring target image in a period (hereafter referred to as "predicted period") determined based on the predicted time. The predicted period may be set by an observer beforehand, or set according to the status analyzed by the monitoring target analysis means 16.

As the feature extracted from the monitoring target image, a feature with which the monitoring target can be specified is selected beforehand according to the monitoring target. As an example, in the case where the monitoring target is a person, the monitoring target feature extraction means 18 may extract a face feature from the monitoring target image as the feature with which the person can be specified. As another example, in the case where the monitoring target is a car, the monitoring target feature extraction means 18 may extract a license plate from the monitoring target image as the feature with which the car can be specified. The features mentioned here are each an example of the feature with which the monitoring target can be specified, and the monitoring target feature extraction means 18 may extract other features as the feature with which the monitoring target can be specified.

The monitoring target feature extraction means 18 may extract the feature of the monitoring target, using only the monitoring target image captured at the predicted time. However, since there is a high possibility that the movement status of the monitoring target changes, it is more preferable to use the monitoring target image in the period including extra time both before and after the predicted time, thus facilitating the specification of the monitoring target.

Accordingly, the monitoring target extraction camera 13 may create the monitoring target image in the predicted period. By narrowing down the period in which the monitoring target extraction camera 13 creates the monitoring target image to the period in which the monitoring target is expected to appear in this way, it is possible to improve the accuracy in specifying the monitoring target. This process also contributes to a smaller amount of data handled, and lower computational complexity in the process of specifying the object by the below-mentioned object specification means 20.

In the case where the monitoring target analysis means 16 analyzes the appearance of the monitoring target, the monitoring target feature extraction means 18 may narrow down the monitoring target whose feature is to be extracted, based on the analyzed appearance. For example, in the case where the monitoring target is a person and the monitoring target analysis means 16 analyzes the cloths of a person, the monitoring target feature extraction means 18 may extract the feature of the person specified by the cloths.

By specifying the monitoring target whose feature is to be extracted according to the appearance in this way, the process of extracting a feature of a monitoring target having low relevance between the cameras can be suppressed. This contributes to a smaller amount of data, and lower computational complexity in the extraction process.

The monitoring target feature extraction means 18 may calculate a likelihood indicating the degree of probability of the monitoring target, together with the feature of the monitoring target. For instance, the monitoring target feature extraction means 18 may assign the highest likelihood to the monitoring target extracted from the monitoring target image captured at the time close to the predicted time, and the lower likelihood to the monitoring target extracted from the monitoring target image captured at the time farther from the predicted time.

Moreover, for example in the case where the monitoring target analysis means 16 analyzes the appearance of the monitoring target, the monitoring target feature extraction means 18 may use the similarity between the analyzed appearance and the appearance of the monitoring target extracted from the monitoring target image, as the likelihood of the monitoring target.

The monitoring target feature extraction means 18 registers the extracted feature of the monitoring target and information relating to the monitoring target, in the gray list storage means 19. For instance, the monitoring target feature extraction means 18 may register a face image itself, as the extracted feature of the monitoring target.

The gray list storage means 19 stores the feature of the monitoring target extracted by the monitoring target feature extraction means 18. In detail, the gray list storage means 19 stores the feature of the monitoring target and the specific state for which the monitoring target is extracted, in association with each other.

The gray list storage means 19 may store the identification information of the state detection camera 11 detecting the specific state, in association with the monitoring target. Moreover, in the case where the monitoring target feature extraction means 18 calculates the likelihood of the monitoring target, the gray list storage means 19 may store the likelihood in association with the monitoring target. The information stored in the gray list storage means 19 is information used when the below-mentioned object specification means 20 specifies the object, and so is also referred to as "gray list" in the following description.

The object specification means 20 compares, for each type of specific state, features of monitoring targets extracted from a plurality of monitoring target images by the monitoring target feature extraction means 18, and specifies a monitoring target that appears with a high frequency as the object. In detail, the object specification means 20 may compare features of monitoring targets corresponding to a common type of specific state from among the features of the monitoring targets stored in the gray list storage means 19, and specify, as the object, a monitoring target for which a feature estimated to be identical is extracted at least a predetermined number of times.

The monitoring targets compared here may be monitoring targets captured by the same camera or monitoring targets captured by different cameras, so long as they correspond to the common type of specific state.

Figure 2:
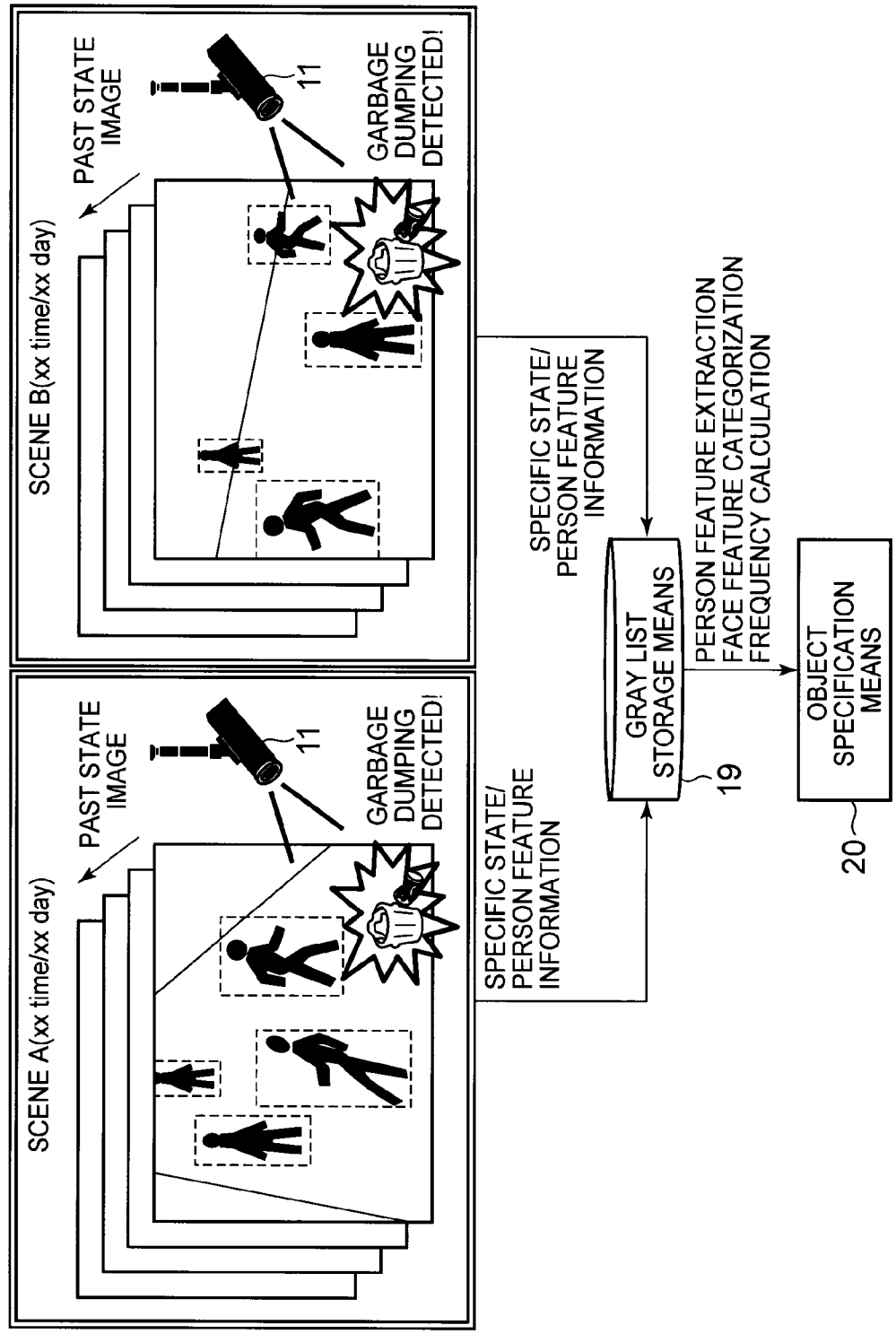
FIG. 2 It is an explanatory diagram depicting an example of the case where state images are captured by different cameras.

FIG. 2 is an explanatory diagram depicting an example of the case where state images are captured by different cameras. In the example depicted in FIG. 2, two cameras capture state images of different ranges, each to detect the garbage dumping state. In such a case, the feature of the monitoring target and the garbage dumping state as the specific state are eventually stored in the gray list storage means 19 in association with each other. Hence, the object specification means 20 can specify the object using the state images captured by the different cameras.

In the case where the likelihood of each monitoring target is available, the object specification means 20 may use the likelihood of each monitoring target as an element for calculating the frequency. For instance, the object specification means 20 may specify monitoring targets having features that are estimated to be identical, and use the sum of the likelihoods of the monitoring targets as the frequency. Alternatively, the object specification means 20 may use the product of the likelihoods of the monitoring targets as the frequency.

The specific state detection means 15, the monitoring target analysis means 16, the time prediction means 17, the monitoring target feature extraction means 18, and the object specification means 20 are realized by a CPU of a computer operating according to a program (monitoring target extraction program). As an example, the program may be stored in a storage unit (not depicted) in an information terminal for realizing the object monitoring system, with the CPU reading the program and, according to the program, operating as the specific state detection means 15, the monitoring target analysis means 16, the time prediction means 17, the monitoring target feature extraction means 18, and the object specification means 20.

The state detection camera 11 and the monitoring target extraction camera 13 may respectively create the state image and the monitoring target image as instructed by the CPU operating according to the program (monitoring target extraction program).

The specific state detection means 15, the monitoring target analysis means 16, the time prediction means 17, the monitoring target feature extraction means 18, and the object specification means 20 may each be realized by dedicated hardware. Though the object specification means 20 is included in the object monitoring system in the above description, the object specification means 20 may be implemented in another host system, as an example.

The state image storage means 12, the monitoring target image storage means 14, and the gray list storage means 19 are realized, for example, by a magnetic disk or the like.

Figure 3:
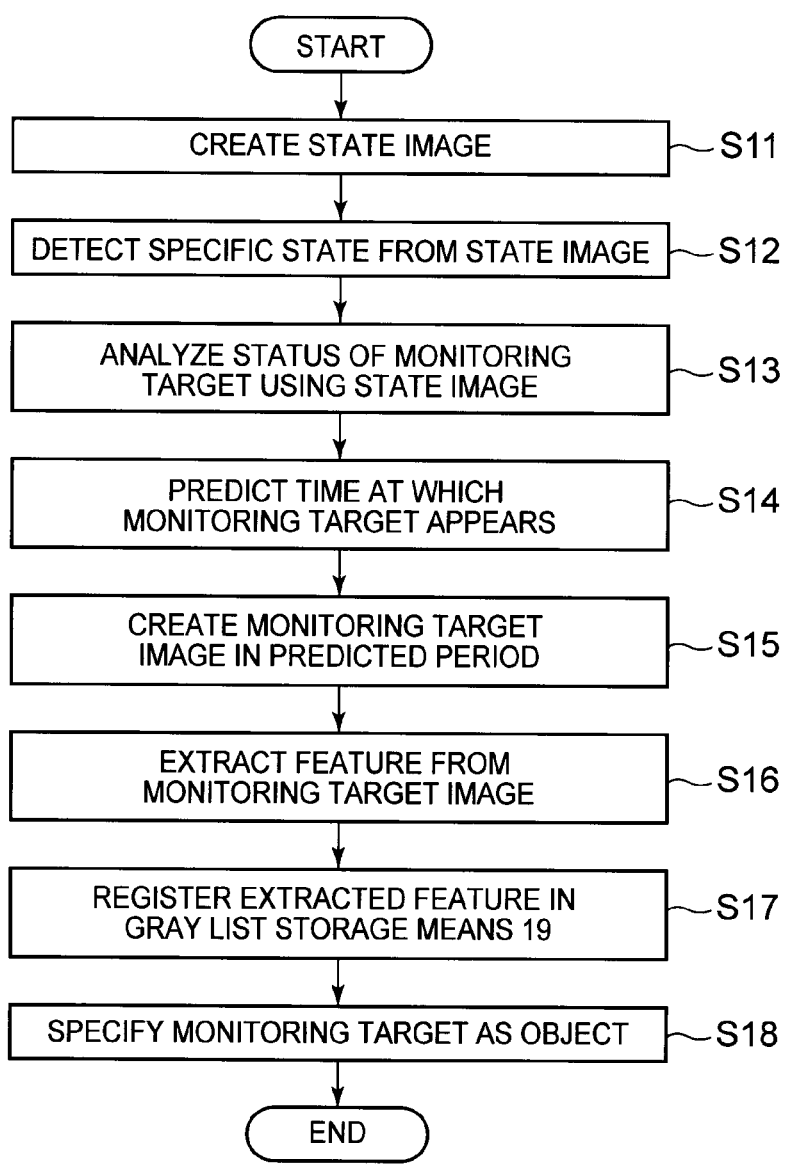
FIG. 3 It is a flowchart depicting an example of operations of the object monitoring system.

The following describes operations of the object monitoring system in this exemplary embodiment. FIG. 3 is a flowchart depicting an example of operations of the object monitoring system in this exemplary embodiment.

First, the state detection camera 11 creates the state image by capturing the state occurring in the first range (step S11). Here, the state detection camera 11 may register the state image in the state image storage means 12. When the specific state detection means 15 detects the specific state from the state image (step S12), the monitoring target analysis means 16 analyzes the status of the monitoring target using the state image from which the specific state is detected (step S13).

The time prediction means 17 predicts the time at which the monitoring target appears in the second range, from the status of the monitoring target (step S14). The monitoring target extraction camera 13 creates the monitoring target image by capturing the monitoring target present in the second range, in the period determined based on the predicted time (step S15). The monitoring target feature extraction means 18 extracts the feature used for specifying the monitoring target, such as the face feature, from the monitoring target image (step S16), and registers the extracted feature in the gray list storage means 19 (step S17).

After this, the object specification means 20 compares the features of the monitoring targets for each type of specific state, and specifies the monitoring target that appears with a high frequency, as the object (step S18).

Figure 4:
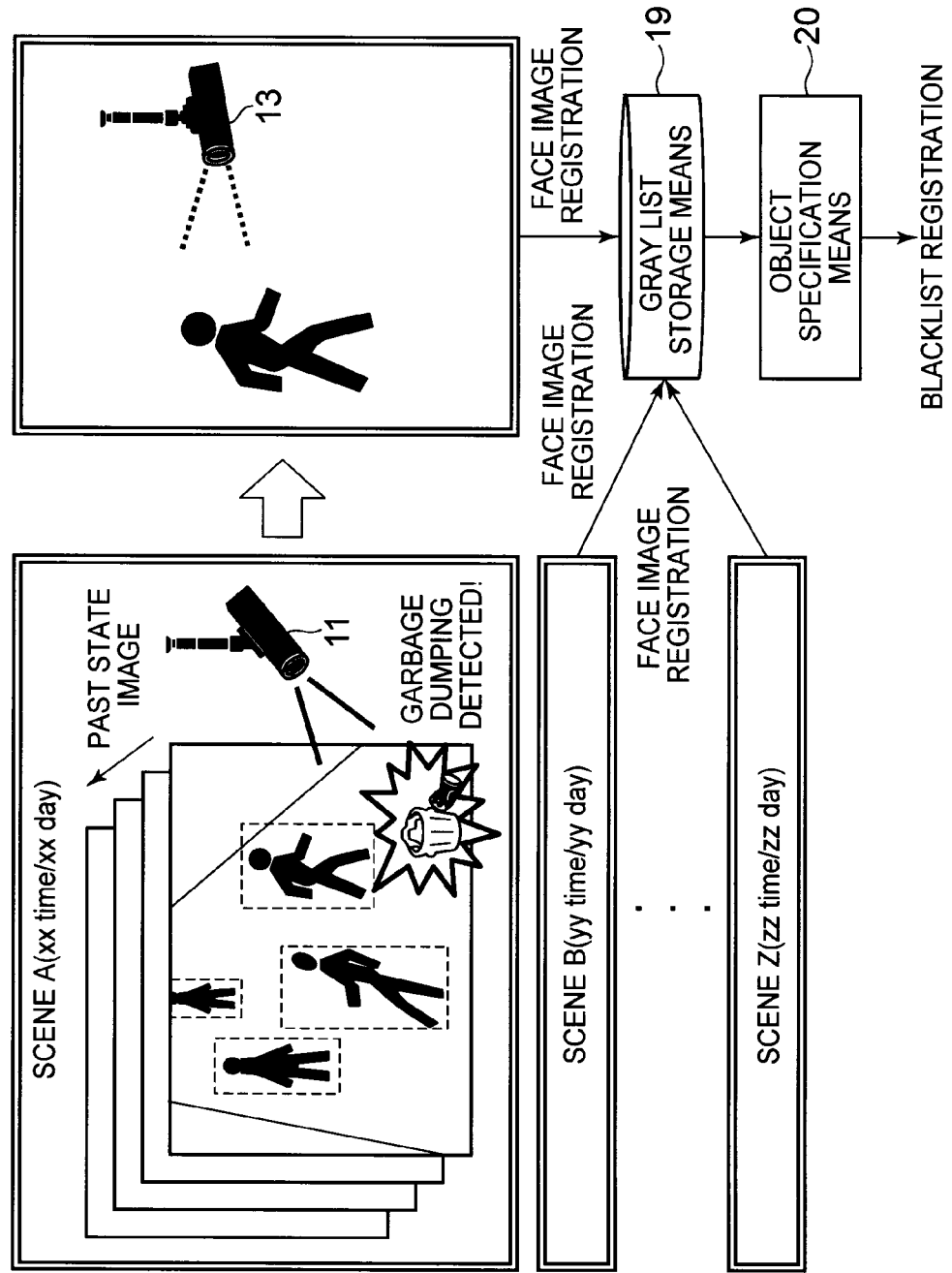
FIG. 4 It is an explanatory diagram depicting a specific example of the object monitoring system.

The following describes a specific example of the object monitoring system in this exemplary embodiment. FIG. 4 is an explanatory diagram depicting a specific example of the object monitoring system in this exemplary embodiment. The example depicted in FIG. 4 concerns the operation of detecting the garbage dumping state and specifying a person who seems to be a habitual offender.

The state detection camera 11 installed to detect the garbage dumping state captures the state image of the first range at regular intervals. When the specific state detection means 15 detects the garbage dumping state from the state image, the monitoring target analysis means 16 analyzes a person who seems to be a habitual offender, by referring to the past state images.

The time prediction means 17 predicts the time at which the monitoring target appears in the range captured by the monitoring target extraction camera 13, from the status of the monitoring target analyzed by the monitoring target analysis means 16. The monitoring target extraction camera 13 installed away from the state detection camera 11 captures the monitoring target image including the face image of every possible person, at the predicted time or in the predicted period.

The monitoring target feature extraction means 18 extracts the feature of the monitoring target from the captured monitoring target image in consideration of time constraints and cloth similarity, and registers the extracted feature of the monitoring target in the gray list storage means 19.

Each time the specific state (garbage dumping state) is detected, the same process is performed to register the extracted feature of the monitoring target in the gray list storage means 19. The object specification means 20 then extracts a person who is determined to be identical many times, using a face recognition technique. The object specification means 20 registers the person in a blacklist (watch list).

As described above, according to this exemplary embodiment, the state detection camera 11 creates the state image by capturing the state occurring in the first range. The specific state detection means 15 detects the specific state from the state image. The monitoring target analysis means 16 analyzes the status of the monitoring target, using the state image from which the specific state is detected. The monitoring target feature extraction means 18 extracts the feature used for specifying the monitoring target from the monitoring target image captured by the monitoring target extraction camera 13, based on the analyzed status of the monitoring target.

Here, the time prediction means 17 may predict the time at which the monitoring target appears in the second range from the status of the monitoring target, so that the monitoring target extraction camera 13 creates the monitoring target image by capturing the monitoring target present in the second range in the period determined based on the predicted time.

With the structure described above, an object that is presumed to be a cause of a specific state can be automatically collected from images captured by installed cameras.

The object monitoring system in this exemplary embodiment uses two types of images, i.e. the image (state image) in which the monitoring target is hard to be specified but the specific state can be detected and the image (monitoring target image) in which the specific state is hard to be detected but the monitoring target can be specified. From the state image, the information (e.g. cloths) for narrowing down the monitoring target is extracted, though the monitoring target cannot be specified. From the monitoring target image, the feature (e.g. face feature) for specifying the monitoring target is extracted.

The object monitoring system in this exemplary embodiment uses these two types of information having a relative difference in monitoring target identifiability. In other words, these two types of information may differ in identifiability due to the difference in resolution between the cameras capturing the extraction target. The monitoring target can be efficiently narrowed down by simultaneously using these information having different properties.

Figure 5:
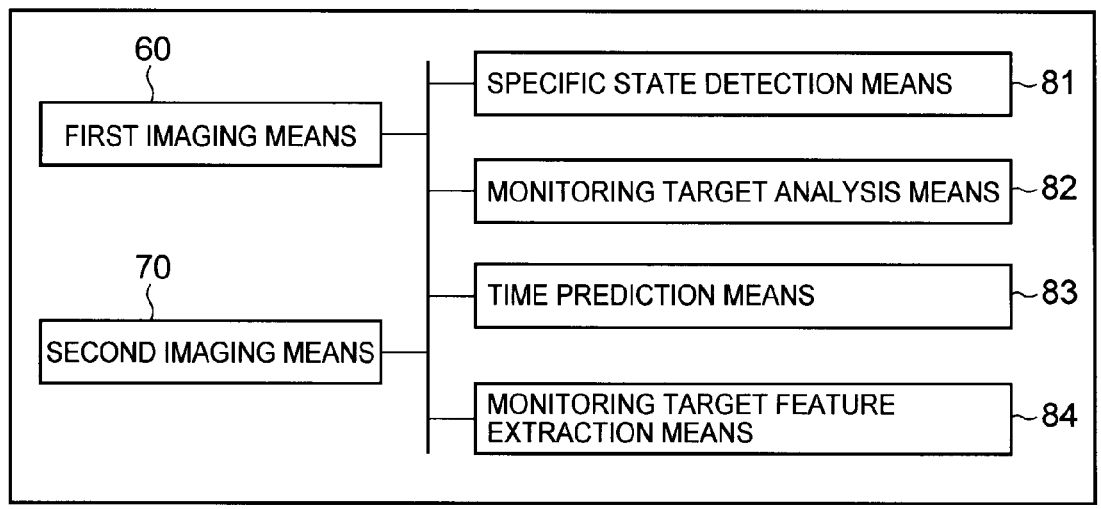
FIG. 5 It is a block diagram depicting a schematic structure of the object monitoring system according to the present invention.

The following describes a schematic structure according to the present invention. FIG. 5 is a block diagram depicting a schematic structure of the object monitoring system according to the present invention. The object monitoring system depicted in FIG. 5 as an example includes: first imaging means 60 (e.g. the state detection camera 11) for creating a state image by capturing a state occurring in a first range; second imaging means 70 (e.g. the monitoring target extraction camera 13) for creating a monitoring target image by capturing a monitoring target present in a second range; specific state detection means 81 (e.g. the specific state detection means 15) for detecting a specific state (e.g. garbage dumping) from the state image; monitoring target analysis means 82 (e.g. the monitoring target analysis means 16) for analyzing a status (e.g. movement status, cloths) of a monitoring target, using the state image from which the specific state is detected; time prediction means 83 (e.g. the time prediction means 17) for predicting a time at which the monitoring target appears in the second range, from the status of the monitoring target; and monitoring target feature extraction means 84 (e.g. the monitoring target feature extraction means 18) for extracting, from the monitoring target image, a feature (e.g. face feature) used for specifying the monitoring target.

The second imaging means 70 creates the monitoring target image in a period determined based on the time predicted by the time prediction means 83.

With such a structure, an object that is presumed to be a cause of a specific state can be automatically collected from images captured by installed cameras.

Moreover, the monitoring target analysis means 82 may analyze a movement status of the monitoring target, wherein the time prediction means 83 predicts the time at which the monitoring target appears in the second range, based on the movement status.

Moreover, the object monitoring system may include past state image storage means (e.g. the state image storage means 12) for storing a past state image created in the past, wherein the monitoring target analysis means 82 analyzes the movement status of the monitoring target, using the state image from which the specific state is detected and the past state image captured within a predetermined period before the state image is captured. With such a structure, the movement status of the monitoring target can be determined more appropriately.

Moreover, the monitoring target analysis means 82 may analyze an appearance (e.g. cloths, shape) of the monitoring target, wherein the monitoring target feature extraction means 84 narrows down the monitoring target whose feature is to be extracted, based on the analyzed appearance. With such a structure, the process of extracting a feature of a monitoring target having low relevance between the cameras can be suppressed. This contributes to a smaller amount of data, and lower computational complexity in the extraction process.

Moreover, the second imaging means 70 may create the monitoring target image by capturing a person as the monitoring target, wherein the monitoring target feature extraction means 84 extracts a face feature of the person from the monitoring target image.

Moreover, the object monitoring system may include object specification means (e.g. the object specification means 20) for comparing, for each type (e.g. garbage dumping) of specific state, features of monitoring targets extracted from a plurality of monitoring target images by the monitoring target feature extraction means 84, and specifying, as an object, a monitoring target estimated to appear with a high frequency.

Here, the object specification means may specify the monitoring target for which a feature estimated to be identical is extracted at least a predetermined number of times, as the object. Moreover, the monitoring target feature extraction means 84 may calculate a likelihood indicating a degree of probability of the monitoring target, together with the feature of the monitoring target, wherein the object specification means specifies the monitoring target using the likelihood.

Figure 6:
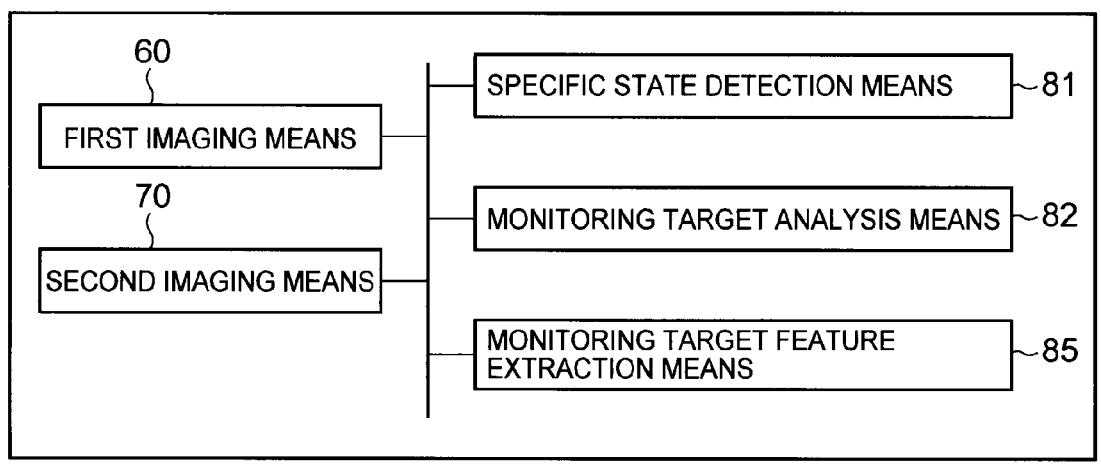
FIG. 6 It is a block diagram depicting another schematic structure of the object monitoring system according to the present invention.

The object monitoring system according to the present invention may not include the time prediction means 83 depicted in FIG. 5 as an example. FIG. 6 is a block diagram depicting another schematic structure of the object monitoring system according to the present invention. The object monitoring system depicted in FIG. 6 as an example includes: the first imaging means 60 (e.g. the state detection camera 11); the second imaging means 70 (e.g. the monitoring target extraction camera 13); the specific state detection means 81 (e.g. the specific state detection means 15); the monitoring target analysis means 82 (e.g. the monitoring target analysis means 16); and monitoring target feature extraction means 85 (e.g. the monitoring target feature extraction means 18) for extracting, from the monitoring target image, a feature used for specifying the monitoring target, based on the status of the monitoring target.

The first imaging means 60, the second imaging means 70, the specific state detection means 81, and the monitoring target analysis means 82 are the same as the respective means depicted in FIG. 5 as an example. With such a structure, too, an object that is presumed to be a cause of a specific state can be automatically collected from images captured by installed cameras.

Figure 7:
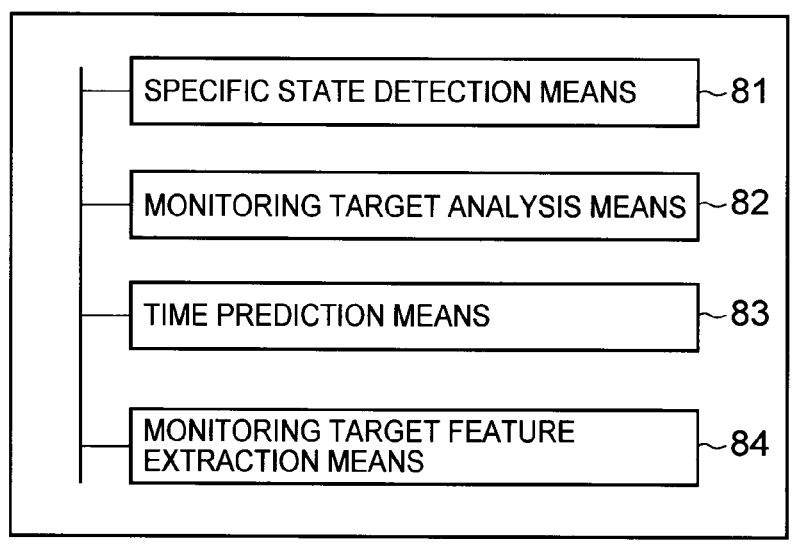
FIG. 7 It is a block diagram depicting a schematic structure of a monitoring target extraction device according to the present invention.

FIG. 7 is a block diagram depicting a schematic structure of a monitoring target extraction device according to the present invention. The monitoring target extraction device depicted in FIG. 7 as an example includes: the specific state detection means 81 (e.g. the specific state detection means 15); the monitoring target analysis means 82 (e.g. the monitoring target analysis means 16); the time prediction means 83 (e.g. the time prediction means 17); and the monitoring target feature extraction means 84 (e.g. the monitoring target feature extraction means 18).

The specific state detection means 81, the monitoring target analysis means 82, the time prediction means 83, and the monitoring target feature extraction means 84 are the same as the respective means depicted in FIG. 5 as an example. With such a structure, too, an object that is presumed to be a cause of a specific state can be automatically collected from images captured by installed cameras.

Figure 8:
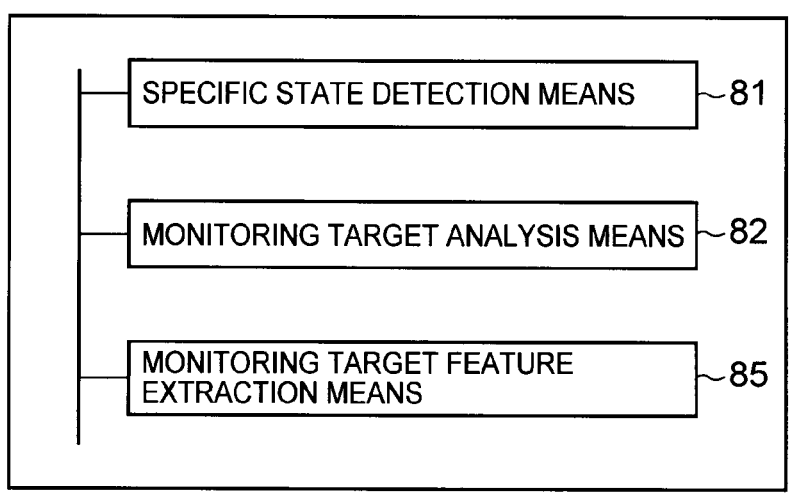
FIG. 8 It is a block diagram depicting another schematic structure of the monitoring target extraction device according to the present invention.

The monitoring target extraction device according to the present invention may not include the time prediction means 83 depicted in FIG. 7 as an example. FIG. 8 is a block diagram depicting another schematic structure of the monitoring target extraction device according to the present invention. The monitoring target extraction device depicted in FIG. 8 as an example includes: the specific state detection means 81 (e.g. the specific state detection means 15); the monitoring target analysis means 82 (e.g. the monitoring target analysis means 16); and the monitoring target feature extraction means 85 (e.g. the monitoring target feature extraction means 18).

The specific state detection means 81 and the monitoring target analysis means 82 are the same as the respective means depicted in FIG. 5 as an example. The monitoring target feature extraction means 85 is the same as the means depicted in FIG. 7 as an example. With such a structure, too, an object that is presumed to be a cause of a specific state can be automatically collected from images captured by installed cameras.

The exemplary embodiment described above may be partly or wholly described in the following supplementary notes, though the present invention is not limited to the following.

(Supplementary note 1) A monitoring target extraction device including: specific state detection means for detecting a specific state from a state image captured by first imaging means for capturing a state occurring in a first range; monitoring target analysis means for analyzing a status of a monitoring target, using the state image from which the specific state is detected; and monitoring target feature extraction means for extracting, from a monitoring target image captured by second imaging means for capturing a monitoring target present in a second range, a feature used for specifying the monitoring target, based on the status of the monitoring target.

(Supplementary note 2) The monitoring target extraction device according to supplementary note 1, including time prediction means for predicting a time at which the monitoring target appears in the second range captured by the second imaging means, from the status of the monitoring target, wherein the monitoring target feature extraction means extracts the feature used for specifying the monitoring target, from the monitoring target image captured by the second imaging means in a period determined based on the time predicted by the time prediction means.

(Supplementary note 3) The monitoring target extraction device according to supplementary note 2, wherein the monitoring target analysis means analyzes a movement status of the monitoring target, using the state image from which the specific state is detected, and wherein the time prediction means predicts the time at which the monitoring target appears in the second range, based on the movement status.

(Supplementary note 4) The monitoring target extraction device according to supplementary note 3, including past state image storage means for storing a past state image created in the past, wherein the monitoring target analysis means analyzes the movement status of the monitoring target, using the state image from which the specific state is detected and the past state image captured within a predetermined period before the state image is captured.

(Supplementary note 5) The monitoring target extraction device according to any one of supplementary notes 1 to 4, wherein the monitoring target analysis means analyzes an appearance of the monitoring target, and wherein the monitoring target feature extraction means narrows down the monitoring target whose feature is to be extracted, based on the analyzed appearance.

(Supplementary note 6) The monitoring target extraction device according to any one of supplementary notes 1 to 5, wherein the monitoring target feature extraction means extracts, from the monitoring target image created by the second imaging means capturing a person as the monitoring target, a face feature of the person.

(Supplementary note 7) The monitoring target extraction device according to any one of supplementary notes 1 to 6, including object specification means for comparing, for each type of specific state, features of monitoring targets extracted from a plurality of monitoring target images by the monitoring target feature extraction means, and specifying, as an object, a monitoring target estimated to appear with a high frequency.

(Supplementary note 8) The monitoring target extraction device according to supplementary note 7, wherein the object specification means specifies the monitoring target for which a feature estimated to be identical is extracted at least a predetermined number of times, as the object.

(Supplementary note 9) The monitoring target extraction device according to supplementary note 7 or 8, wherein the monitoring target feature extraction means calculates a likelihood indicating a degree of probability of the monitoring target, together with the feature of the monitoring target, and wherein the object specification means specifies the monitoring target using the likelihood.

(Supplementary note 10) An object monitoring method including: creating a state image by capturing a state occurring in a first range; detecting a specific state from the state image; analyzing a status of a monitoring target, using the state image from which the specific state is detected; creating a monitoring target image by capturing a monitoring target present in a second range, based on the status of the monitoring target; and extracting, from the monitoring target image, a feature used for specifying the monitoring target.

(Supplementary note 11) The object monitoring method according to supplementary note 10, including: predicting a time at which the monitoring target appears in the second range, from the status of the monitoring target; creating the monitoring target image by capturing the monitoring target present in the second range in a period determined based on the predicted time; and extracting the feature used for specifying the monitoring target, from the monitoring target image.

(Supplementary note 12) The object monitoring method according to supplementary note 11, including: analyzing a movement status of the monitoring target, using the state image from which the specific state is detected; and predicting the time at which the monitoring target appears in the second range, based on the movement status.

(Supplementary note 13) The object monitoring method according to supplementary note 12, including analyzing the movement status of the monitoring target, using the state image from which the specific state is detected and a past state image captured within a predetermined period before the state image is captured.

(Supplementary note 14) The object monitoring method according to any one of supplementary notes 10 to 13, including: analyzing an appearance of the monitoring target; and narrowing down the monitoring target whose feature is to be extracted, based on the analyzed appearance.

(Supplementary note 15) The object monitoring method according to any one of supplementary notes 10 to 14, including extracting, from the monitoring target image created by the second imaging means capturing a person as the monitoring target, a face feature of the person.

(Supplementary note 16) The object monitoring method according to any one of supplementary notes 10 to 15, including comparing, for each type of specific state, features of monitoring targets extracted from a plurality of monitoring target images, and specifying, as an object, a monitoring target estimated to appear with a high frequency.

(Supplementary note 17) The object monitoring method according to supplementary note 16, including specifying the monitoring target for which a feature estimated to be identical is extracted at least a predetermined number of times, as the object.

(Supplementary note 18) The object monitoring method according to supplementary note 16 or 17, including: calculating a likelihood indicating a degree of probability of the monitoring target, together with the feature of the monitoring target; and specifying the monitoring target using the likelihood.

(Supplementary note 19) A monitoring target extraction method including: detecting a specific state from a state image captured by first imaging means for capturing a state occurring in a first range; analyzing a status of a monitoring target, using the state image from which the specific state is detected; and extracting, from a monitoring target image captured by second imaging means for capturing a monitoring target present in a second range, a feature used for specifying the monitoring target, based on the status of the monitoring target.

(Supplementary note 20) The monitoring target extraction method according to supplementary note 19, including: predicting a time at which the monitoring target appears in the second range captured by the second imaging means, from the status of the monitoring target; and extracting the feature used for specifying the monitoring target, from the monitoring target image captured by the second imaging means in a period determined based on the predicted time.

(Supplementary note 21) The monitoring target extraction method according to supplementary note 20, including: analyzing a movement status of the monitoring target, using the state image from which the specific state is detected; and predicting the time at which the monitoring target appears in the second range, based on the movement status.

(Supplementary note 22) The monitoring target extraction method according to supplementary note 21, including analyzing the movement status of the monitoring target, using the state image from which the specific state is detected and a past state image captured within a predetermined period before the state image is captured.

(Supplementary note 23) The monitoring target extraction method according to any one of supplementary notes 19 to 22, including: analyzing an appearance of the monitoring target; and narrowing down the monitoring target whose feature is to be extracted, based on the analyzed appearance.

(Supplementary note 24) The monitoring target extraction method according to any one of supplementary notes 19 to 23, including extracting, from the monitoring target image created by the second imaging means capturing a person as the monitoring target, a face feature of the person.

(Supplementary note 25) The monitoring target extraction method according to any one of supplementary notes 19 to 24, including comparing, for each type of specific state, features of monitoring targets extracted from a plurality of monitoring target images, and specifying, as an object, a monitoring target estimated to appear with a high frequency.

(Supplementary note 26) The monitoring target extraction method according to supplementary note 25, including specifying the monitoring target for which a feature estimated to be identical is extracted at least a predetermined number of times, as the object.

(Supplementary note 27) The monitoring target extraction method according to supplementary note 25 or 26, including: calculating a likelihood indicating a degree of probability of the monitoring target, together with the feature of the monitoring target; and specifying the monitoring target using the likelihood.

(Supplementary note 28) A monitoring target extraction program for causing a computer to execute: a specific state detection process of detecting a specific state from a state image captured by first imaging means for capturing a state occurring in a first range; a monitoring target analysis process of analyzing a status of a monitoring target, using the state image from which the specific state is detected; and a monitoring target feature extraction process of extracting, from a monitoring target image captured by second imaging means for capturing a monitoring target present in a second range, a feature used for specifying the monitoring target, based on the status of the monitoring target.

(Supplementary note 29) The monitoring target extraction program according to supplementary note 28, causing the computer to execute a time prediction process of predicting a time at which the monitoring target appears in the second range captured by the second imaging means, from the status of the monitoring target, wherein the monitoring target extraction program causes the computer to, in the monitoring target feature extraction process, extract the feature used for specifying the monitoring target, from the monitoring target image captured by the second imaging means in a period determined based on the predicted time.

(Supplementary note 30) The monitoring target extraction program according to supplementary note 29, causing the computer to: in the monitoring target analysis process, analyze a movement status of the monitoring target, using the state image from which the specific state is detected; and in the time prediction process, predict the time at which the monitoring target appears in the second range, based on the movement status.

(Supplementary note 31) The monitoring target extraction program according to supplementary note 30, causing the computer to, in the monitoring target analysis process, analyze the movement status of the monitoring target, using the state image from which the specific state is detected and a past state image captured within a predetermined period before the state image is captured.

(Supplementary note 32) The monitoring target extraction program according to any one of supplementary notes 28 to 31, causing the computer to: in the monitoring target analysis process, analyze an appearance of the monitoring target; and in the monitoring target feature extraction process, narrow down the monitoring target whose feature is to be extracted, based on the analyzed appearance.

(Supplementary note 33) The monitoring target extraction program according to any one of supplementary notes 28 to 32, causing the computer to, in the monitoring target feature extraction process, extract, from the monitoring target image created by the second imaging means capturing a person as the monitoring target, a face feature of the person.

(Supplementary note 34) The monitoring target extraction program according to any one of supplementary notes 28 to 33, causing the computer to execute an object specification process of comparing, for each type of specific state, features of monitoring targets extracted from a plurality of monitoring target images in the monitoring target feature extraction process, and specifying, as an object, a monitoring target estimated to appear with a high frequency.

(Supplementary note 35) The monitoring target extraction program according to supplementary note 34, causing the computer to, in the object specification process, specify the monitoring target for which a feature estimated to be identical is extracted at least a predetermined number of times, as the object.

(Supplementary note 36) The monitoring target extraction program according to supplementary note 34 or 35, causing the computer to: in the monitoring target feature extraction process, calculate a likelihood indicating a degree of probability of the monitoring target, together with the feature of the monitoring target; and in the object specification process, specify the monitoring target using the likelihood.

(Supplementary note 37) A monitoring system including: a first camera; a second camera; and extraction means for extracting, based on a status of a monitoring target when a specific state occurs in an image obtained from the first camera, a candidate for the monitoring target from an image obtained from the second camera.

(Supplementary note 38) The monitoring system according to supplementary note 37, wherein the first camera captures a wider range than the second camera.

(Supplementary note 39) The monitoring system according to supplementary note 38, wherein the first camera is installed with a larger depression angle than the second camera.

(Supplementary note 40) A monitoring method including extracting, based on a status of a monitoring target when a specific state occurs in an image obtained from a first camera, a candidate for the monitoring target from an image obtained from a second camera.

(Supplementary note 41) The monitoring method according to supplementary note 40, wherein the first camera captures a wider range than the second camera.

(Supplementary note 42) The monitoring method according to supplementary note 41, wherein the first camera is installed with a larger depression angle than the second camera.

(Supplementary note 43) A monitoring target extraction program for causing a computer to execute an extraction process of extracting, based on a status of a monitoring target when a specific state occurs in an image obtained from a first camera, a candidate for the monitoring target from an image obtained from a second camera.

(Supplementary note 44) The monitoring target extraction program according to supplementary note 43, causing the computer to, in the extraction process, extract, based on the status of the monitoring target when the specific state occurs in the image obtained from the first camera for capturing a wider range than the second camera, the candidate for the monitoring target from the image obtained from the second camera.

(Supplementary note 45) The monitoring target extraction program according to supplementary note 44, causing the computer to, in the extraction process, extract, based on the status of the monitoring target when the specific state occurs in the image obtained from the first camera installed with a larger depression angle than the second camera, the candidate for the monitoring target from the image obtained from the second camera.

Though the present invention has been described with reference to the above exemplary embodiment and examples, the present invention is not limited to the above exemplary embodiment and examples. Various changes understandable by those skilled in the art within the scope of the present invention can be made to the structures and details of the present invention.

This application claims priority based on Japanese Patent Application No. 2013-070961 filed on Mar. 29, 2013, the disclosure of which is incorporated herein in its entirety.

REFERENCE SIGNS LIST 11 state detection camera
12 state image storage means
13 monitoring target extraction camera
14 monitoring target image storage means
15 specific state detection means
16 monitoring target analysis means
17 time prediction means
18 monitoring target feature extraction means
19 gray list storage means
20 object specification means

The invention claimed is:

1. An object monitoring system comprising:
a memory storing instructions; and
at least one processor configured to process the instructions to:
create a state image by capturing a state occurring in a first range,
create a monitoring target image by capturing a monitoring target present in a second range,
detect a specific state from the state image,
extract, from the monitoring target image created after the specific state has been detected, a feature used for specifying the monitoring target, based on the status of the monitoring target, and
specify, for each type of specific state, as an object, a monitoring target which appears with a high frequency in a plurality of monitoring target images.

2. The object monitoring system according to claim 1, wherein the at least one processor is further configured to process the instructions to:
predict a time at which the monitoring target appears in the second range, from the status of the monitoring target,
create the monitoring target image in a period determined based on the predicted time, and
extract the feature used for specifying the monitoring target, from the monitoring target image.

3. The object monitoring system according to claim 2, wherein the at least one processor is further configured to process the instructions to:
analyze a movement status of the monitoring target, and
predict the time at which the monitoring target appears in the second range, based on the movement status.

4. The object monitoring system according to claim 3, wherein the at least one processor is further configured to process the instructions to:
store a past state image created in the past, and
analyze the movement status of the monitoring target, using the state image from which the specific state is detected and the past state image captured within a predetermined period before the state image is captured.

5. The object monitoring system according to claim 1, wherein the at least one processor is further configured to process the instructions to:
analyze an appearance of the monitoring target, and
narrow down the monitoring target whose feature is to be extracted, based on the analyzed appearance.

6. The object monitoring system according to claim 1, wherein the at least one processor is further configured to process the instructions to:
create the monitoring target image by capturing a person as the monitoring target, and
extract a face feature of the person from the monitoring target image.

7. The object monitoring system according to claim 1, wherein the at least one processor is further configured to process the instructions to:
compare, for each type of specific state, features of monitoring targets extracted from the plurality of monitoring target images to estimate the monitoring target which appears with a high frequency in the plurality of monitoring target images.

8. The object monitoring system according to claim 7, wherein the at least one processor is further configured to process the instructions to:
specify the monitoring target for which a feature estimated to be identical is extracted at least a predetermined number of times, as the object.

9. The object monitoring system according to claim 7, wherein the at least one processor is further configured to process the instructions to:
calculate a likelihood indicating a degree of probability of the monitoring target, together with the feature of the monitoring target, and
specify the monitoring target using the likelihood.

10. A monitoring target extraction device comprising:
a memory storing instructions; and
at least one processor configured to process the instructions to:
detect a specific state from a state image captured by a first imaging device which captures a state occurring in a first range,
extract, from a monitoring target image captured by a second imaging device which captures a monitoring target present in a second range after the specific state has been detected, a feature used for specifying the monitoring target, based on the status of the monitoring target, and
specify, for each type of specific state, as an object, a monitoring target which appears with a high frequency in a plurality of monitoring target images.

11. The monitoring target extraction device according to claim 10, wherein the at least one processor is further configured to process the instructions to:
predict a time at which the monitoring target appears in the second range, from the status of the monitoring target, and
extract the feature used for specifying the monitoring target, from the monitoring target image in a period determined based on the predicted time.

12. An object monitoring method, implemented by at least one processor, the object monitoring method comprising:
creating a state image by capturing a state occurring in a first range;
detecting a specific state from the state image;
creating a monitoring target image by capturing a monitoring target present in a second range, based on the status of the monitoring target;
extracting, from the monitoring target image created after the specific state has been detected, a feature used for specifying the monitoring target; and
specifying, for each type of specific state, as an object, a monitoring target which appears with a high frequency in a plurality of monitoring target images.

13. The object monitoring method according to claim 12, comprising:
predicting a time at which the monitoring target appears in the second range, from the status of the monitoring target;
creating the monitoring target image by capturing the monitoring target present in the second range in a period determined based on the predicted time; and
extracting the feature used for specifying the monitoring target, from the monitoring target image.

14. A monitoring target extraction method, implemented by at least one processor, the monitoring target extraction method comprising:
detecting a specific state from a state image capturing a state occurring in a first range;
extracting, from a monitoring target image capturing a monitoring target present in a second range, after the specific state has been detected, a feature used for specifying the monitoring target, based on the status of the monitoring target; and
specifying, for each type of specific state, as an object, a monitoring target which appears with a high frequency in a plurality of monitoring target images.

15. The monitoring target extraction method according to claim 14, comprising:
predicting a time at which the monitoring target appears in the second range, from the status of the monitoring target; and
extracting the feature used for specifying the monitoring target, from the monitoring target image in a period determined based on the predicted time.

16. A non-transitory computer readable information recording medium storing a monitoring target extraction program, when executed by a processor, performs a method for:
detecting a specific state from a state image capturing a state occurring in a first range;
extracting, from a monitoring target image capturing a monitoring target present in a second range, after the specific state has been detected, a feature used for specifying the monitoring target, based on the status of the monitoring target; and
specifying, for each type of specific state, as an object, a monitoring target which appears with a high frequency in a plurality of monitoring target images.

17. The non-transitory computer readable information recording medium according to claim 16, wherein the method is further for:
predicting a time at which the monitoring target appears in the second range, from the status of the monitoring target; and
extracting the feature used for specifying the monitoring target, from the monitoring target image in a period determined based on the predicted time.

* * * * *